US011200597B2

(12) United States Patent
DeAngelo et al.

(10) Patent No.: US 11,200,597 B2
(45) Date of Patent: Dec. 14, 2021

(54) SYSTEMS AND METHODS FOR IDENTIFICATION OF PREDICTED CONSUMER SPEND BASED ON HISTORICAL PURCHASE ACTIVITY PROGRESSIONS

(71) Applicant: Vantiv, LLC, Cincinnati, OH (US)

(72) Inventors: Scott Wayne DeAngelo, Mason, OH (US); Brent Alan Badger, Powell, OH (US); Jacob Matthew Sterling, Creve Coeur, MO (US); Dennis A. Kettler, Lebanon, OH (US)

(73) Assignee: Worldpay, LLC, Symmes Township, OH (US)

( * ) Notice: Subject to any disclaimer, the term of this patent is extended or adjusted under 35 U.S.C. 154(b) by 949 days.

(21) Appl. No.: 14/989,858

(22) Filed: Jan. 7, 2016

(65) Prior Publication Data

US 2017/0200192 A1    Jul. 13, 2017

(51) Int. Cl.
*G06Q 30/02*    (2012.01)
(52) U.S. Cl.
CPC ..... *G06Q 30/0255* (2013.01); *G06Q 30/0261* (2013.01)

(58) Field of Classification Search
CPC .................. G06Q 30/0255; G06Q 30/0261
See application file for complete search history.

(56) References Cited

U.S. PATENT DOCUMENTS

| 2010/0274669 | A1* | 10/2010 | Carlson | G06Q 30/0261 |
| | | | | 705/14.58 |
| 2014/0278857 | A1* | 9/2014 | Bergman | G06Q 30/0211 |
| | | | | 705/14.13 |

OTHER PUBLICATIONS

Kooti et al. Portrait of an Online Shopper: Understanding and Predicting Consumer Behavior. ACM, pp. 205-2014. (Year: 2016).*

* cited by examiner

*Primary Examiner* — Michael W Schmucker
*Assistant Examiner* — Christopher C Busch
(74) *Attorney, Agent, or Firm* — Bookoff McAndrews PLLC (57) ABSTRACT

Technologies for identifying prospective marketing targets based on payment vehicle-based payment transactions processed over electronic payment networks are disclosed. Payment vehicle-based payment transactions are analyzed to determine historical purchase activity progressions. Consumer behavior can be mapped to a historical purchase activity progression so that future spend behavior of the consumer can be identified.

18 Claims, 6 Drawing Sheets

SYSTEMS AND METHODS FOR IDENTIFICATION OF PREDICTED CONSUMER SPEND BASED ON HISTORICAL PURCHASE ACTIVITY PROGRESSIONS

BACKGROUND

Accurately predicting a consumer's future spending behavior can allow a financial institution (such as a credit company, lender, transaction processor, etc.) or another consumer services company (such as retail establishment, food/beverage establishment, marketing firm, etc.) to better target potential prospects and identify opportunities to increase consumer transaction volumes.

BRIEF DESCRIPTION OF THE DRAWINGS

It is believed that certain embodiments will be better understood from the following description taken in conjunction with the accompanying drawings, in which like references indicate similar elements and in which.

DETAILED DESCRIPTION

Various non-limiting embodiments of the present disclosure will now be described to provide an overall understanding of the principles of the structure, function, and use of the systems and methods disclosed herein. One or more examples of these non-limiting embodiments are illustrated in the selected examples disclosed and described in detail with reference made to the figures in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

For simplicity, the description that follows will be provided by reference to "payment vehicles" or "payment cards," which generally refer to any type of financial alternative to currency (i.e., cash/coins). As is to be clear to those skilled in the art, no aspect of the present disclosure is specifically limited to a specific type of payment vehicle or payment card. Therefore, it is intended that the following description encompasses the use of the present disclosure with many other forms of financial alternatives to currency, including credit cards, debit cards, smart cards, single-use cards, pre-paid cards, electronic currency (such as might be provided through a cellular telephone or personal digital assistant), digital wallets, and the like. Payment vehicles or payment cards can be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, pre-paid or stored-value cards, or any other like financial transaction instrument.

In accordance with the present disclosure, historical purchase activity progressions can be determined based on historical purchase activity of payment card holders. Based on these historical purchase activity progressions, future spending activities of consumers or segments of consumers can be predicted. Subsequently, various marketing efforts, or other business processes, can be employed to influence those future spending activities. Beneficially, these prospective marketing efforts can be tailored so that they are directed to a targeted consumer base, such that conversion percentage, redemption volume, perceived relevance, or other desired outcome, can be increased.

In accordance with the present disclosure, purchase activity associated with payment vehicle-based purchased transactions originating at a variety of merchants can be collected for analysis. Through the analysis of transaction data associated with this purchase activity, certain behavioral spending patterns can be identified. Historical purchase activity progressions can then be determined based on statistical analysis of the transaction data. For instance, the transaction data can indicate that consumers that make a first purchase at a particular merchant and then make a second purchase at a second merchant within a particular timeframe, are then likely to make a third purchase at a particular merchant. The historical purchase activity progressions can identify merchants by categories, such that a first purchase event at a merchant included within a first category, a second purchase event at a merchant included within a second category, and a third purchase event at a merchant included with a third category is identified as a known progression, based on consumer spending patterns. The categories used to structure historical purchase activity progressions can be defined by merchant category code (i.e., MCC), merchant name, or other categorizations, such as geography-based categorization, for example. Furthermore, historical purchase activity progressions can include temporal parameters, such that each of the purchase transactions typically occurs within a particular timeframe, such as within 1 hour, 1 day, 1 week, for example. As is to be appreciated, any number of historical purchase activity progressions can be determined. Moreover, the historical purchase activity progressions can be augmented, or even deemed to be obsolete, over time as more transactional data is available for review and consumer purchasing behavior changes over time. The analysis of payment vehicle-based purchase transactions includes the assessment of non-human readable information and data, as the transaction data collected can be received from point-of-sale devices and systems of merchants that are configured to generate network messaging in accordance with various payment processing message specifications, such as ISO 8583, among others.

Once historical purchase activity progressions are determined through the review of the transaction data, they can then be used to predict future purchase transactions of consumers. A consumer's spending behavior can be assessed to determine if it maps to, or otherwise follows or matches, any of the historical purchase activity progressions. When a consumer (or consumer segment) is determined to be mapped to a historical purchase activity progression, the future spending activity of the consumer can be predicted based on the purchase activity identified in the particular progression or progressions to which the consumer's activity is mapped. For example, a particular historical purchase activity progression may identify a series of 7 transactions that a consumer typically performs in a certain order over a certain period of time. It may be determined that a consumer has performed 5 of the transactions. In this case, the remaining 2 transactions are predicted to occur. Using this prediction of future spending activity, marketing efforts or other business processes can be deployed to further influence or modify the predicted spending behavior.

Various approaches to mapping or modeling consumer behavior can be utilized in accordance with the present disclosure. For example, historical purchase activity progressions can be used in association with individual marketing campaigns of a single merchant, an ongoing marketing program for a single merchant, or for a combination or coalition of merchants or other entities. Behavior can be predicted based on any of a variety of factors or parameters associated with transactions, such as merchant identity, merchant category, time, day, and/or velocity that can be compared against parameters set for campaigns, marketing programs, etc. If certain behavior of a consumer is predicted, then offers, incentives, or other communications can be provided to consumer through one or more channels. Furthermore, assessing and predicting behavior in accordance with the present disclosure can be used in a variety of implementations to provide a range of consumer-related data. For example, certain spend patterns or behaviors of a consumer can indicate the consumer is likely to attrite, such as if a consumer misses a predetermined spend window. Based on the generation of the early attrition indicator, a merchant can use marketing efforts to retain that consumer.

Figure 1:
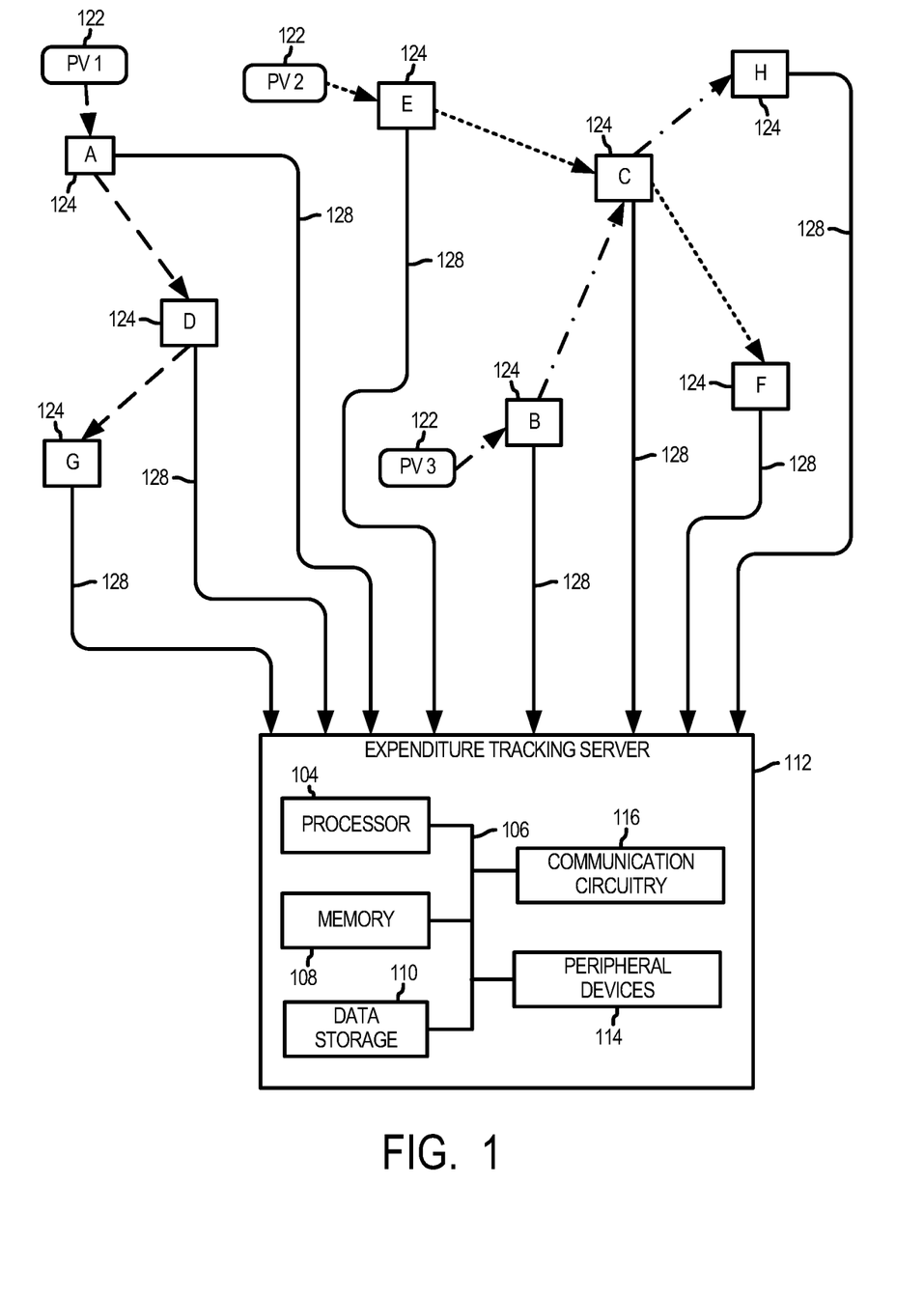
FIG. 1 depicts an example expenditure tracking server that tracks consumer spending behaviors across a plurality of merchants to determine historical purchase activity progressions.

Referring now to FIG. 1, an expenditure tracking server 112 is depicted that tracks consumer spending across a plurality of merchants to determine historical purchase activity progressions. Merchants A-H that accept payment vehicles via point-of-sale systems or other point-of-interaction devices are schematically depicted and are generally referred to herein as merchants 124. Furthermore, in accordance with some embodiments, each merchant A through H depicted FIG. 1 can represent individual merchants, merchant category types, and/or other groupings of merchants (such as merchants grouped by geography).

The merchants 124 can provide purchase transaction data to the expenditure tracking server 112, as indicated by data streams 128. In some cases, the data streams 128 are part of or wholly comprised of payment processing messaging, as is used to effectuate a payment vehicle transaction such that there is an electronic transfer of funds via an electronic payment network. For example, the data streams 128 can include data supplied by POS systems of the merchants 124 to an acquirer computing system. As such, the data streams 128 can include data used for authorization messaging, such as merchant identifier (MID), merchant category code (MCC), time/date information, and so forth. In some embodiments, the merchants 124 can have computing systems that provide the data streams 128 to the expenditure tracking server 112, such as through API calls or other data transfer techniques.

Various consumers are schematically shown initiating payment vehicle transactions at the merchants 124 using payment vehicles that are depicted as PV1, PV2, and PV3, and generally referred to as payment vehicles 122. While only three payment vehicles 122 are depicted in FIG. 1 for the purposes of illustration, the payment vehicles 122 shown in FIG. 1 can be representative of hundreds, thousands, or hundreds of thousands of payment vehicles, or segments or other groupings of payment vehicles, as may be needed to statistically define historical purchase activity progressions. Referring first to PV1, a series of payment vehicle-based payment transactions is shown to have occurred at merchant A, then merchant D, and finally at merchant G. A data stream 128 was provided by each merchant A, D, G to the expenditure tracking server 112. As such, the expenditure tracking server 112 receives spending behavior of the cardholder of PV1. Similar data can be collected from PV2 and PV3. As illustrated, the cardholder of PV2 initiated purchase transactions at merchant E, then merchant C, and then merchant F. The cardholder of PV3 initiated purchase transactions at merchant B, then merchant C, and then merchant H. Data streams 128 indicative of each of these transactions can be provided to the expenditure tracking server 112.

The expenditure tracking server 112 can be embodied as any type of computing device or server capable of processing, communicating, storing, maintaining, and transferring data. For example, the expenditure tracking server 112 can be embodied as a microcomputer, a minicomputer, a mainframe, a desktop computer, a laptop computer, a mobile computing device, a handheld computer, a smart phone, a tablet computer, a personal digital assistant, a telephony device, a custom chip, an embedded processing device, or other computing device and/or suitable programmable device. In some embodiments, the expenditure tracking server 112 can be embodied as a computing device integrated with other systems or subsystems, such as those of an acquirer computing system, a financial transaction processing gateway, and/or other entities that function to assist with the processing of financial transactions within a payment ecosystem. In the illustrative embodiment of FIG. 1, the expenditure tracking server 112 includes a processor 104, a system bus 106, a memory 108, a data storage 110, communication circuitry 116, and one or more peripheral devices 114. The expenditure tracking server 112 can include other or additional components, such as those commonly found in a server and/or computer (e.g., various input/output devices). Additionally, in some embodiments, one or more of the illustrative components can be incorporated in, or otherwise from a portion of, another component. For example, the memory 108, or portions thereof, can be incorporated in the processor 104 in some embodiments. Furthermore, it should be appreciated that the expenditure tracking server 112 can include other components, sub-components, and devices commonly found in a computer and/or computing device, which are not illustrated in FIG. 1 for clarity of the description.

The processor 104 can be embodied as any type of processor capable of performing the functions described herein. For example, the processor 104 can be embodied as a single or multi-core processor, a digital signal processor, microcontroller, a general purpose central processing unit (CPU), a reduced instruction set computer (RISC) processor, a processor having a pipeline, a complex instruction set computer (CISC) processor, an application specific integrated circuit (ASIC), a programmable logic device (PLD), a field programmable gate array (FPGA), or other processor or processing/controlling circuit or controller.

In various configurations, the expenditure tracking server 112 includes the system bus 106 for interconnecting the various components of the expenditure tracking server 112.

The system bus 106 can be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations with the processor 104, the memory 108, and other components of the expenditure tracking server 112. In some embodiments, the expenditure tracking server 112 can be integrated into one or more chips such as a programmable logic device or an application specific integrated circuit (ASIC). In such embodiments, the system bus 106 can form a portion of a system-on-a-chip (SoC) and be incorporated, along with the processor 104, the memory 108, and other components of the expenditure tracking server 112, on a single integrated circuit chip.

The memory 108 can be embodied as any type of volatile or non-volatile memory or data storage capable of performing the functions described herein. For example, the memory 108 can be embodied as read only memory (ROM), random access memory (RAM), cache memory associated with the processor 104, or other memories such as dynamic RAM (DRAM), static RAM (SRAM), programmable ROM (PROM), electrically erasable PROM (EEPROM), flash memory, a removable memory card or disk, a solid state drive, and so forth. In operation, the memory 108 can store various data and software used during operation of the expenditure tracking server 112 such as operating systems, applications, programs, libraries, and drivers.

The data storage 110 can be embodied as any type of device or devices configured for short-term or long-term storage of data such as, for example, memory devices and circuits, memory cards, hard disk drives, solid-state drives, or other data storage devices. For example, in some embodiments, the data storage 110 includes storage media such as a storage device that can be configured to have multiple modules, such as magnetic disk drives, floppy drives, tape drives, hard drives, optical drives and media, magneto-optical drives and media, Compact Disc (CD) drives, Compact Disc Read Only Memory (CD-ROM), Compact Disc Recordable (CD-R), Compact Disc Rewriteable (CD-RW), a suitable type of Digital Versatile Disc (DVD) or Blu-Ray disc, and so forth. Storage media such as flash drives, solid state hard drives, redundant array of individual disks (RAID), virtual drives, networked drives and other memory means including storage media on the processor 104, or the memory 108 are also contemplated as storage devices. It should be appreciated that such memory can be internal or external with respect to operation of the disclosed embodiments. It should also be appreciated that certain portions of the processes described herein can be performed using instructions stored on a computer-readable medium or media that direct or otherwise instruct a computer system to perform the process steps. Non-transitory computer-readable media, as used herein, comprises all computer-readable media except for transitory, propagating signals.

The communication circuitry 116 of the expenditure tracking server 112 can be embodied as any type of communication circuit, device, interface, or collection thereof, capable of enabling communications between the expenditure tracking server 112 and computing devices communicatively coupled thereto. For example, the communication circuitry 116 can be embodied as one or more network interface controllers (NICs), in some embodiments. The communication circuitry 116 can be configured to use any one or more communication technologies (e.g., wireless or wired communications) and associated protocols (e.g., Ethernet, WiMAX, etc.) to effect such communication. The expenditure tracking server 112 can communicate over one or more networks. The network(s) can be embodied as any number of various wired and/or wireless communication networks. For example, the network(s) can be embodied as or otherwise include a local area network (LAN), a wide area network (WAN), a cellular network, or a publicly-accessible, global network such as the Internet. Additionally, the network(s) can include any number of additional devices to facilitate communication with other computing devices.

Additionally, in some embodiments, the expenditure tracking server 112 can further include one or more peripheral devices 114. Such peripheral devices 114 can include any type of peripheral device commonly found in a computing device such as additional data storage, speakers, a hardware keyboard, a keypad, a gesture or graphical input device, a motion input device, a touchscreen interface, one or more displays, an audio unit, a voice recognition unit, a vibratory device, a computer mouse, a peripheral communication device, and any other suitable user interface, input/output device, and/or other peripheral device.

Figure 2:
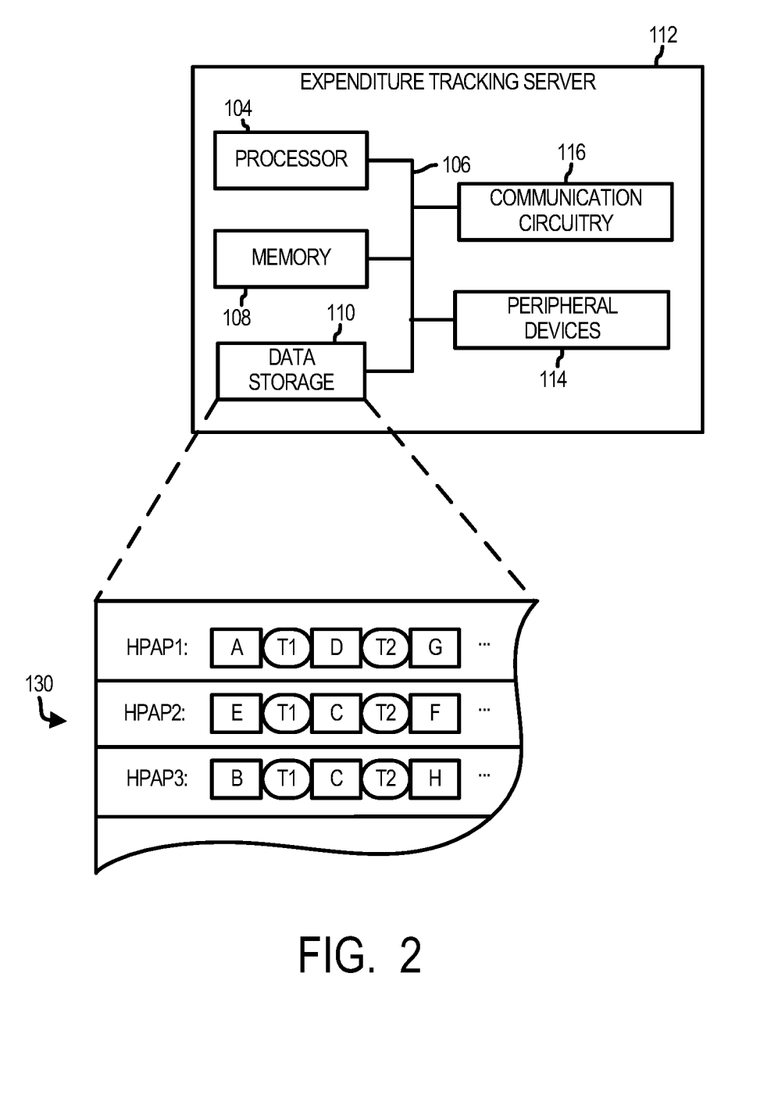
FIG. 2 depicts an example expenditure tracking server defining historical purchase activity progressions.

Referring now to FIG. 2, the expenditure tracking server 112 can track the transactions initiated at the merchants 124 that utilize the payment vehicles 122. Based on these tracked transactions, historical purchase activity progressions, shown as HPAP1, HPAP2, and HPAP3 in FIG. 2 and generally referred to as historical purchase activity progressions 130, can be determined and stored in data storage 110. As is to be appreciated, the historical purchase activity progressions 130 can be based on the processing and analysis of large amounts of transactional data over periods of time. Once determined by the expenditure tracking server 112, each historical purchase activity progression 130 can be used to identify various predicted consumer purchase transactions based on the determination that the consumer's purchase activities are mapped to a particular historical purchase activity progression. The predicted consumer purchase transactions are generally purchase transactions the consumer is likely to make in the future based on their past purchase activity. While the particular purchase activity that is identified can vary, examples include an identification of a particular merchant, an identification of a geographical location of future purchase activity, an identification of a particular merchant category, an identification of a product or service likely to be purchased, so forth. For the simplified example depicted in FIGS. 1-2, each historical purchase activity progression 130 identifies a string of merchants and a temporal factor (shown as T1 and T2) identifying the amount of time, or a time range, between the transactions that occur at the merchants. In some embodiments, historical purchase activity progressions are embodied as marketing campaigns defined by a merchant or collection of merchants. For instance, the marketing campaign can identify that when a consumer initiates certain types of transactions, then the consumer will be provided with an outcome (i.e., coupon, offer, or other type of incentive or reward) through a suitable communication channel.

While the historical purchase activity progressions 130 are schematically shown to include three merchants, it is to be appreciated that historical purchase activity progressions 130 can include any number of merchants, merchant categories, geographical parameters, temporal parameters, as well as any other data that may be useful in mapping consumer behaviors.

Figure 3:
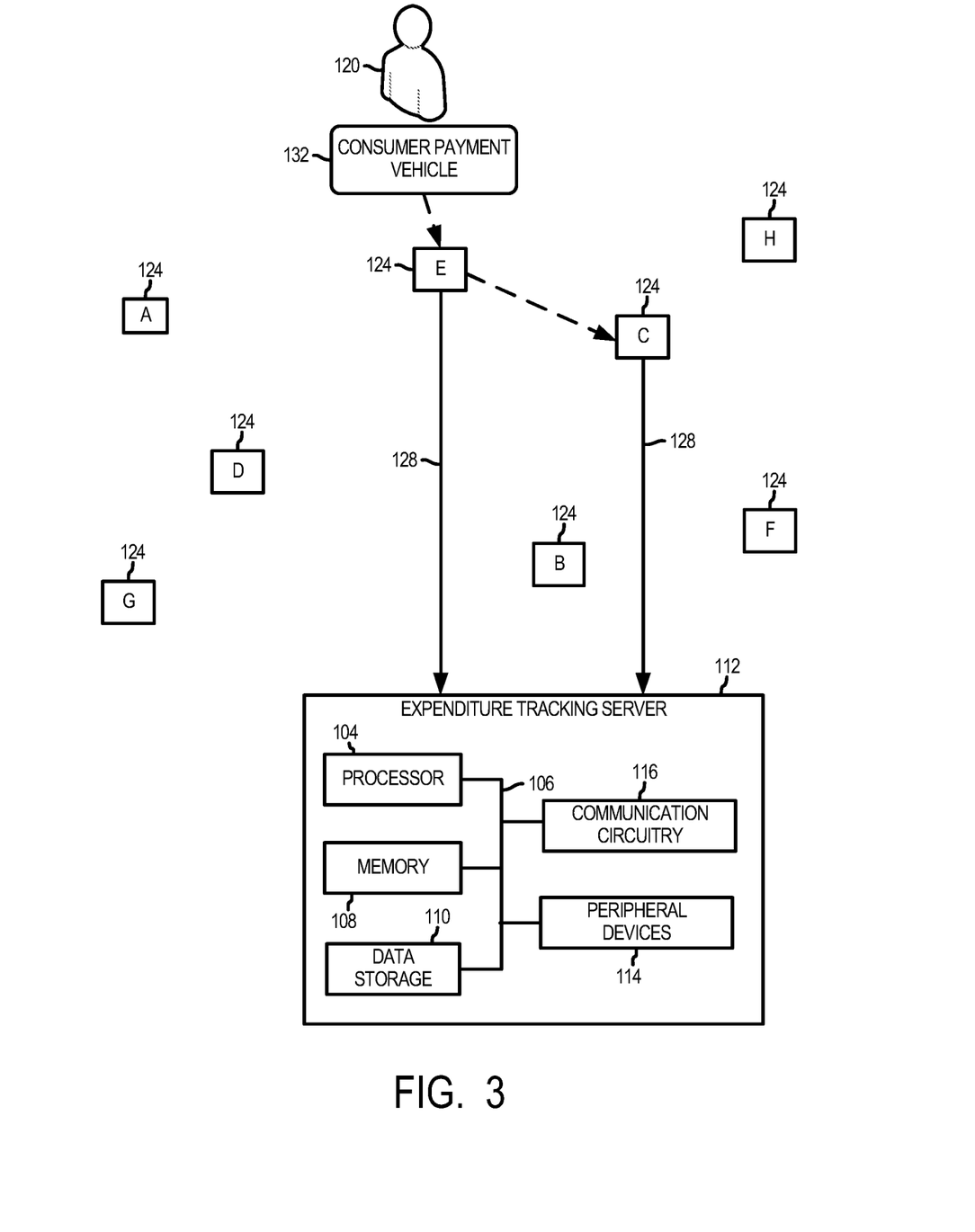
FIGS. 3-4 depict consumer spending behavior of a consumer being assessed by an expenditure tracking server such that future spending behavior can be predicted.
Figure 4:
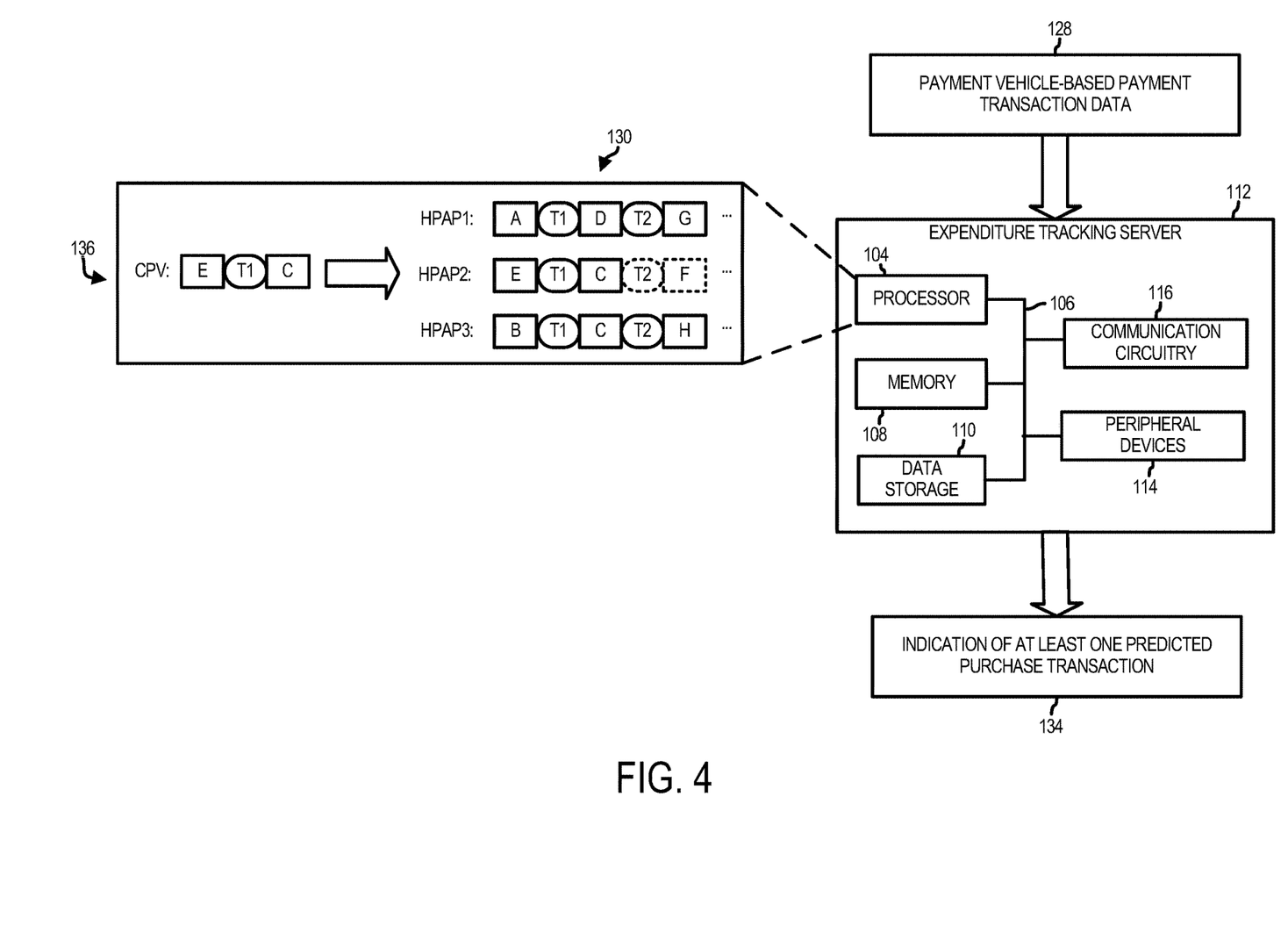

Referring now to FIGS. 3-4, the consumer spending behavior of a consumer 120 can be assessed by the expenditure tracking server 112 such that future spending behavior can be predicted. Referring first to FIG. 3, the consumer 120 first uses a payment vehicle, schematically depicted as consumer payment vehicle 132, to initiate a purchase at merchant E. As described above with regard to FIG. 1, merchant E can provide a data stream 128 (such as an authorization request, for example) to the expenditure tracking server 112. After a period of time, the consumer 120 then uses their consumer payment vehicle 132 to initiate a purchase at merchant C. Merchant C can provide a data stream 128 to the expenditure tracking server 112. It is noted that consumer payment vehicle 132 represents either a single payment vehicle, or a collection of payment vehicles tied to the consumer 120. While FIG. 3 depicts the consumer using the same payment vehicle 132 as merchant E and merchant C, this disclosure is not so limited. In some embodiments, the expenditure tracking server 112 can track the consumer's activity across more than one payment vehicle. Furthermore, in some embodiments, the expenditure tracking server 112 can track collectively track transaction activities for more than one consumer that are within the same household.

Referring now to FIG. 4, the expenditure tracking server 112 is depicted generating an indication 134 of at least one predicted purchase transaction based on payment vehicle-based payment transaction data received via the data streams 128. More specifically, based on the received transaction data from the consumer's 120 purchase activity 136 the expenditure tracking server 112 can attempt to map the purchase activity 136 to one or more historical purchase activity progressions 130. As indicated in FIG. 4, the expenditure tracking server 112 identifies that the purchase activity 136 of the consumer 120 maps to HPAP2. While FIG. 4 depicts a mapping based on merchant and a time parameter, in some other embodiments, mapping is based on, for example, geographical parameters, merchant categories, purchase velocity, purchase amounts, SKU data, and so forth.

Based on the mapping to HPAP2, expenditure tracking server 112 identifies that purchase activity is predicted to occur at merchant F after the time period identified as T2. This predicted purchase activity can be provided to interested parties, such as marketing agencies, merchant, card issuers, financial institutions, and the like. Based on receiving the predicted purchase activity, the recipient can take a variety of actions to influence the behavior of the consumer 120. For example, the recipient can transmit a targeted offer in an attempt to influence the consumer's 120 predicted purchasing event(s).

Figure 5:
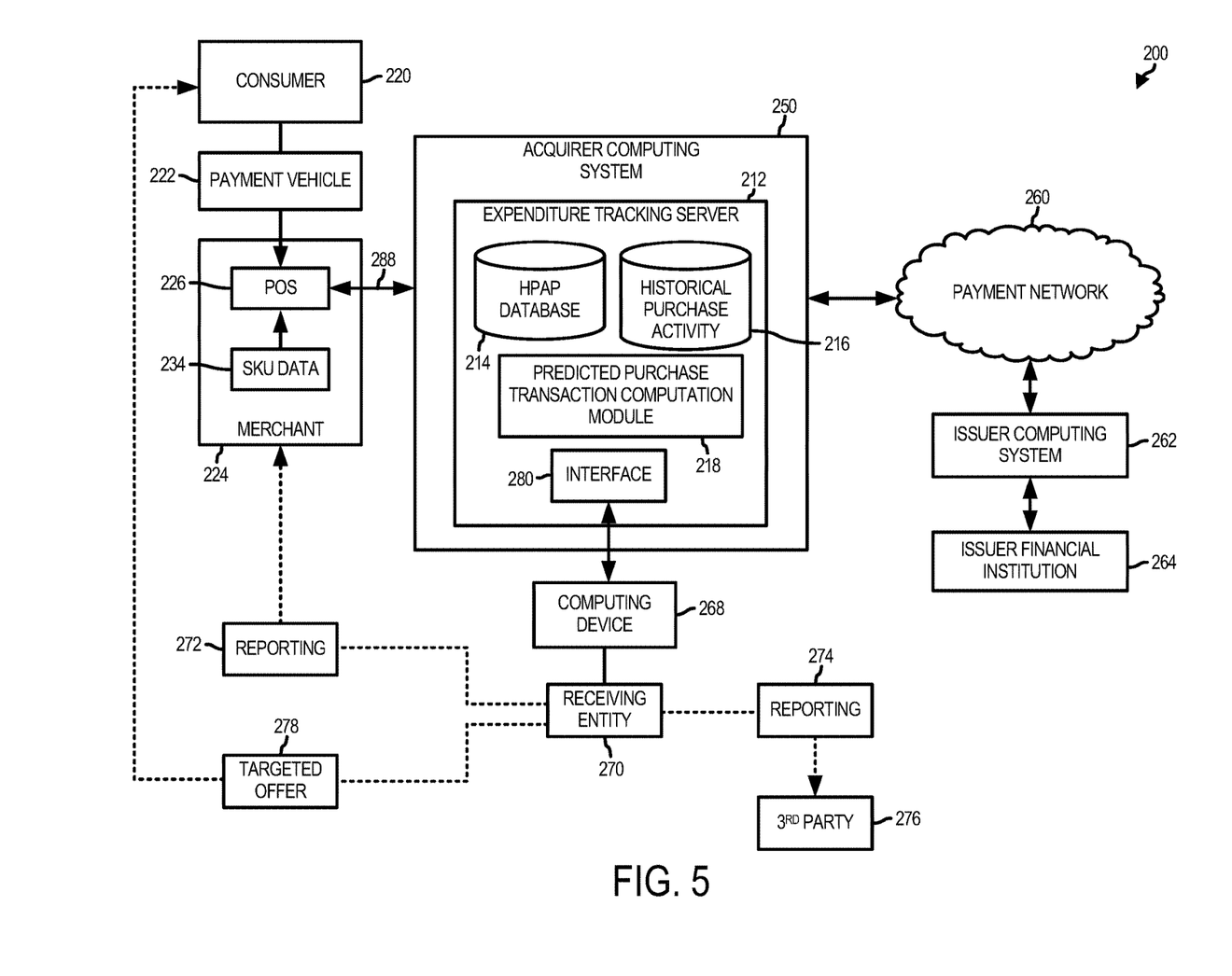
FIG. 5 depicts a block diagram of an example expenditure tracking system with an expenditure tracking server hosted by, or otherwise a component of or affiliated with, an acquirer computing system.

FIG. 5 depicts a block diagram of an example expenditure tracking system 200. In the illustrated embodiment, an expenditure tracking server 212 is hosted by, or otherwise a component of or affiliated with an acquirer computing system 250. The acquirer computing system 250 is configured to communicate point of sale (POS) systems 226 and communicate with one or more payment networks 260 and issuer computing systems 262. For convenience, only one POS system 226 and one issuer computing system 262 is shown. Moreover, as used herein, the term POS system is used broadly to include POS system or point of interaction system at brick and mortar locations and "virtual" POS system that can be associated with an online retailer or "in-app" purchases. In some cases, the POS system includes a terminal, or other network computing system which can be used to facilitate a payment transaction at a merchant location. The POS system 226 is affiliated with a merchant 224. The term merchant, as used herein, refers generally to any type of retailer, service provider, or any other type of business that is in networked communication with the acquirer computing system 250 and uses the payment processing services of the acquirer computing system 250. Payment processing services can include receiving and responding to authorization requests as well as facilitating the settlement of funds associated with card-based transactions occurring at the merchant 224.

In some embodiments, POS system 226 can generally facilitate the transmission of transaction-related information to the acquirer computing system 226, as is known in the art. The transaction-related information can comprise an authorization request as well as other types of identifying indicia. The identifying indicia can vary based on POS system 226, the type of merchant and the type of transaction, but example types of identifying indicia can include any of the following: a merchant identification (MID) identifier, a loyalty program identifier, a bank identification (BIN) identifier; a merchant category code (MCC) identifier; a media access control (MAC) identifier; an internet protocol (IP) identifier; a device fingerprint; a geographic identifier; a payment type identifier; and/or a consumer name or other consumer identifier. In some embodiments, the information provided to the acquirer computing system 226 and/or the expenditure tracking server 212 can include SKU data 234.

In accordance with the present disclosure, the expenditure tracking server 212 of acquirer computing system 250 can provide an HPAP interface 280 that is accessible by a receiving entity 270 through a computing device 268. The particular implementation of the HPAP interface 280 can vary, but in some example embodiments, the expenditure interface 280 is a web portal that allows a receiving entity 270 to review historical purchase activity progressions, review indications of future purchasing activity, and so forth. In some embodiments, the HPAP interface 280 is provided by a specialized application that is executed on the computing device 268. The receiving entity 270 can be associated with, for example, the merchant 224, the issuer financial institution 264, or any other third party, such as a marketing entity. The data regarding the transactions tracked by the expenditure tracking server 212 can be stored in a historical purchase activity database 216. Historical purchase activity progressions can be stored in a HPAP database 214.

Referring still to the acquirer computing system 250, an authorization request can be received from the POS system 226 through communication channel 228 based on the use of a payment vehicle 222. The first authorization request can comprise various data, including, for example, a MID, a MCC, an account identifier, and a transaction amount. Once the authorization request is received, the predicted purchase transaction computation module 218 can determine if the purchase activity of the consumer 220 maps to a historical purchase activity progression of the HPAP database 214.

When it is determined that future spending behavior of the consumer 220 can be predicted, the indication of the future purchase activity can be presented to any suitable parties, depicted as receiving entity 270. In one embodiment, the indication is utilized to develop or otherwise identify a targeted offer 278 to provide to the consumer 220. Thus, such targeted offer 278 can be aimed to incentivize certain future behaviors based on the historical expenditure of the consumer 220. The targeted offer 278 can be stored by the expenditure tracking server 212, such that upon mapping the spending behavior of the consumer 220 to a historical purchase activity progression, a targeted offer associated with predicted purchase activity of that historical purchase activity progression can be provided to the consumer 220. In some embodiments, the targeted offer 224 can be dispatched to prospective marketing targets in an automated fashion based on the outcome of the HPAP analysis.

Figure 6:
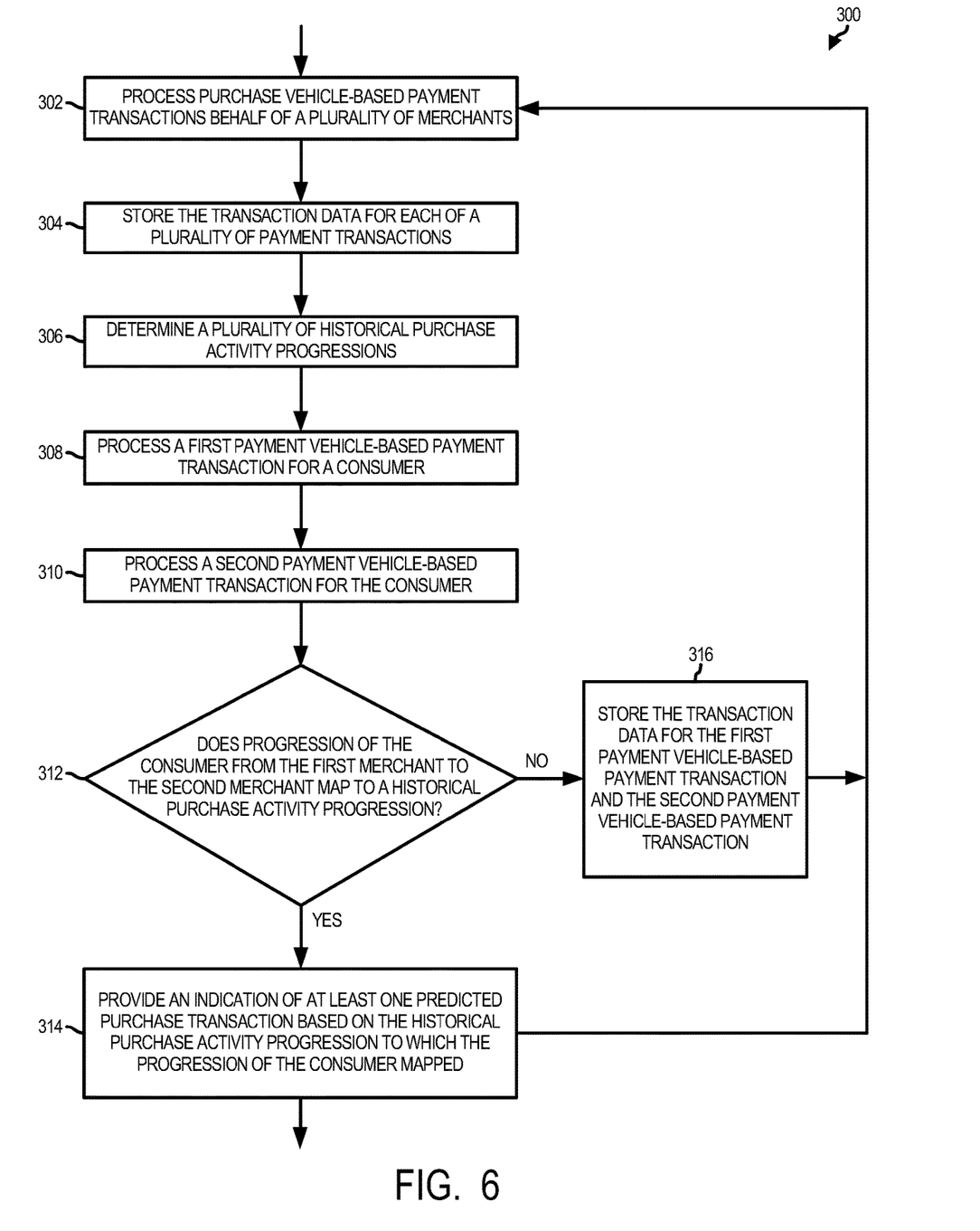
FIG. 6 depicts an example process in which an expenditure tracking server provides an indication of at least one predicted purchase transaction based on historical purchase activity.

Referring now to FIG. 6, an example process 300 is depicted in which an expenditure tracking server, such as expenditure tracking server 212 shown in FIG. 5, provides an indication of at least one predicted purchase transaction based on historical purchase activity. At block 302, purchase vehicle-based payment transactions are processed on behalf of a plurality of merchants, such as the merchant 224 shown FIG. 5. Such processing can be performed by an acquirer computing system, such as acquirer computing system 250 shown in FIG. 5. For each of the payment vehicle-based payment transactions that is processed, transaction data can be received from a point of sale system of the merchants transmitting the transactions. At 304, transaction data for each of a plurality of payment transactions is stored so that data analytics can be performed. Referring again to FIG. 5, for example, the transaction data can be stored in historical purchase activity database 216. At 306 of FIG. 6, an expenditure tracking server determines a plurality of historical purchase activity progressions. Each of the historical purchase activity progressions can identify a series of payment vehicle-based payment transaction types based on an analysis of the transaction data. The payment vehicle-based payment transaction types can include, for example, a merchant type, a merchant category, a geographic parameter, and so forth. The historical purchase activity progression can be stored in the HPAP database 214, as shown in FIG. 5. At 308, the acquirer computing system processes a first payment vehicle-based payment transaction for a consumer at a first merchant. At 310, the acquirer computing system processes a second payment vehicle-based payment transaction for the consumer at a second merchant. At 312, the expenditure tracking server determines whether the progression of the consumer from the first merchant to the second merchant maps to one of the plurality of historical purchase activity progressions. For instance, the expenditure tracking server can determine if there is a historical purchase activity progression that includes a purchase at the first merchant that is followed by a purchase at the second merchant, with the second purchase occurring within a particular timeframe. If the progression of the consumer from the first merchant to the second merchant does not map to one of the plurality of historical purchase activity progressions, the transaction data from the first and second payment vehicle-based payment transactions can be stored at 316. If the progression of the consumer from the first merchant to the second merchant does map to one of the plurality of historical purchase activity progressions, at 314, an indication of at least one predicted purchase transaction based on the historical purchase activity progression to which the progression of the consumer mapped can be provided to a recipient so that action can be taken based on the predicted purchase transaction.

By way of a non-limiting example, the expenditure tracking server can identify a historical purchase activity progression that identifies consumers who make a purchase at a first gas station and then make a purchase at a second gas station that is more than 200 miles away are likely to make a third purchase at a hotel. Accordingly, when a consumer fills up their vehicle at a first gas station and then makes a purchase at a second gas station that is more than 200 miles away, the expenditure tracking server can then determine that the consumer is likely to be looking for a hotel. A notification of this predicted purchase activity can be provided to a suitable recipient, such as a travel company, hotel marketing department, the consumer, or other entity so that action can be taken to modify that consumer's spending behavior. For example, a hotel chain may offer the consumer a discount coupon or other offer to motivate the consumer to book a room at their hotel chain. The notification can be provided using any of a variety of suitable techniques. For notifications provided to a consumer, such as in the form of a targeted offer, the notification can be presented to the consumer via a computing device of the consumer (i.e., email message, text message, social media message, in-app message, etc.) or otherwise tied to a payment vehicle of the consumer (i.e., card-linked offer, etc.). For notifications provided to third parties, such as reporting provided to marketing companies, merchants, and/or financial institutions, the notification can be provided via an API interface, a data file, an email message, or via a web-based portal or interface that is accessible by the third party. In another non-limiting example, a move theater can utilize an expenditure tracking server to identify restaurant transactions satisfying certain parameters that occur within a certain geo-radius of theater. If the parameters are satisfied, an offer could be generated and delivered to the consumer through any suitable channel to incentive the consumer to see a movie at the theater. Such parameters could include, for example, the type of restaurant, the amount of the transaction, the time of the transaction, the date of the transaction, and so forth.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed herein should be taken as mandatory for any specific implementation of any of these the apparatuses, devices, systems or methods unless specifically designated as mandatory. In addition, elements illustrated in the figures are not necessarily drawn to scale for simplicity and clarity of illustration. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment," means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment," in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and include a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client-server distributed systems, and can use other protocols, or operate at other layers in communication protocol stacks, than are described.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art. Rather it is hereby intended the scope of the invention to be defined by the claims appended hereto.

The invention claimed is:

1. A computer-implemented method of predicting consumer behavior based on electronic payment transactions processed over electronic payment networks, comprising:

receiving, by an acquirer computing system, via Application Programming Interface (API) calls, electronic payment transactions data streams from a plurality of merchant computing systems, wherein each of the electronic payment transactions data streams comprises a transaction authorization request electronically received from a point of sale system of one of the plurality of merchant computing systems by the acquirer computing system to effectuate an electronic transfer of funds via an electronic payment network, the transaction authorization requests comprising transaction data including a merchant identifier, a transaction time, and a geographic identifier;

storing, in a database associated with the acquirer computing system, the transaction data for each of a plurality of payment transactions;

generating, by an expenditure tracking server implemented in the acquirer computing system, and based on an analysis of the transaction data, a plurality of historical purchase activity progressions, wherein each of the plurality of historical purchase activity progressions identifies a series of electronic payment transaction types, a historical temporal factor between each successive pair of electronic payment transaction types of the series of electronic payment transaction types, and a historical geographical parameter between each successive pair of electronic payment transaction types of the series of electronic payment transaction types;

subsequent to generating the plurality of historical purchase activity progressions, processing, by the acquirer computing system, a first electronic payment transaction for a consumer, wherein the first electronic payment transaction for the consumer originates at a first merchant computing system and is associated with a first electronic payment transaction type;

subsequent to processing the first payment transaction from the consumer, processing, by the acquirer computing system, a second electronic payment transaction for the consumer, wherein the second electronic payment transaction for the consumer originates at a second merchant computing system and is associated with a second electronic payment transaction type;

generating, by the expenditure tracking server and based on an analysis of the first and the second electronic payment transactions, a current purchase activity progression, wherein the current purchase activity progression identifies the first and the second electronic payment transaction types, a current temporal factor between the first and the second electronic payment transaction types, and a current geographical parameter between the first and the second electronic payment transaction types;

mapping, by the expenditure tracking server, the current purchase activity progression to one of the plurality of historical purchase activity progressions stored in the database, the mapping comprising:

matching, by a processor of the expenditure tracking server, the first and the second electronic payment transaction types to a successive pair of electronic payment transaction types in the one of the plurality of historical purchase activity progressions stored in the database, matching, by the processor of the expenditure tracking server, the current temporal factor to a historical temporal factor corresponding to the successive pair of electronic payment transaction types in the one of the plurality of historical purchase activity progressions stored in the database, and matching, by the processor of the expenditure tracking server, the current geographical parameter to a historical geographical parameter corresponding to the successive pair of electronic payment transaction types in the one of the plurality of historical purchase activity progressions stored in the database;

upon mapping the current purchase activity progression to a historical purchase activity progression of the plurality of historical purchase activity progressions stored in the database, generating and transmitting, by the expenditure tracking server, an indication of at least one predicted purchase transaction based on that historical purchase activity progression stored in the database;

generating and providing, by a specialized application executed on a computing device, a historical purchase activity progression interface, the historical purchase activity progression interface being a web portal configured to allow a receiving entity on the first merchant computing system and/or the second merchant computing system to review the plurality of historical purchase activity progressions;

generating, by the expenditure tracking server, a targeted offer for use by the consumer based on the indication of at least one predicted purchase transaction; and automatically transmitting, by the expenditure tracking server, the targeted offer for use by the consumer in accordance with an application programming interface (API).

2. The method of claim 1, wherein the series of electronic payment transaction types of each historical purchase activity progression identifies at least one merchant type.

3. The method of claim 1, wherein the series of electronic payment transaction types of each historical purchase activity progression identifies at least one geographical location.

4. The method of claim 1, wherein the temporal factor is a time range.

5. The method of claim 1, wherein the determining whether the current purchase activity progression maps to one of the plurality of historical purchase activity progressions comprises determining if a merchant type of the first merchant computing system and a merchant type of the second merchant computing system matches a series of electronic payment transaction types for at least one of the plurality of historical purchase activity progressions.

6. The method of claim 1, wherein the providing the indication of the at least one predicted purchase transaction comprises providing an indication of at least a merchant type of the predicted purchase transaction.

7. The method of claim 1, wherein providing the targeted offer for use by the consumer at the predicted purchase transaction comprises transmitting an electronic offer to the consumer.

8. A system of predicting consumer behavior based on electronic payment transactions processed over electronic payment networks, comprising an acquirer computing system having one or more processors and a non-transitory computer readable medium having instructions stored thereon which when executed by a processor cause the one or more processors to:

receive, by the acquirer computing system, via Application Programming Interface (API) calls, electronic payment transactions data streams on behalf of a plurality of merchant computing systems, wherein each of the electronic payment transactions data streams comprises a transaction authorization request electronically received from a point of sale system of one of the plurality of merchant computing systems by the acquirer computing system to effectuate an electronic transfer of funds via an electronic payment network, the transaction authorization request comprising transaction data including a merchant identifier, a transaction time, and a geographic identifier;

store the transaction data for each of a plurality of payment transactions in a database;

generate a plurality of historical purchase activity progressions based on an analysis of the transaction data, wherein each of the plurality of historical purchase activity progressions identifies a series of electronic payment transaction types, a historical temporal factor between each successive pair of electronic payment transaction types of the series of electronic payment transaction types, and a historical geographical parameter between each successive pair of electronic payment transaction types of the series of electronic payment transaction types;

subsequent to generating the plurality of historical purchase activity progressions, process a first electronic payment transaction for a consumer, wherein the first electronic payment transaction for the consumer originates at a first merchant computing system and is associated with a first electronic payment transaction type;

subsequent to processing the first payment transaction from the consumer, process a second electronic payment transaction for the consumer, wherein the second electronic payment transaction for the consumer originates at a second merchant computing system and is associated with a second electronic payment transaction type;

generate, based on an analysis of the first and the second electronic payment transactions, a current purchase activity progression, wherein the current purchase activity progression identifies the first and the second electronic payment transaction types, a current temporal factor between the first and the second electronic payment transaction types, and a current geographical parameter between the first and the second electronic payment transaction types;

map the current purchase activity progression to one of the plurality of historical purchase activity progressions, the mapping comprising:

matching, by a processor of the expenditure tracking server, the first and the second electronic payment transaction types to a successive pair of electronic payment transaction types in the one of the plurality of historical purchase activity progressions stored in the database, matching, by the processor of the expenditure tracking server, the current temporal factor to a historical temporal factor corresponding to the successive pair of electronic payment transaction types in the one of the plurality of historical purchase activity progressions stored in the database, and matching, by the processor of the expenditure tracking server, the current geographical parameter to a historical geographical parameter corresponding to the successive pair of electronic payment transaction types in the one of the plurality of historical purchase activity progressions stored in the database;

upon mapping the current purchase activity progression to a historical purchase activity progression of the plurality of historical purchase activity progressions stored in the database, generate and transmit, by an expenditure tracking server, an indication of at least one predicted purchase transaction based on that historical purchase activity progression stored in the database;

generating and providing, by a specialized application executed on a computing device, a historical purchase activity progression interface, the historical purchase activity progression interface being a web portal configured to allow a receiving entity on the first merchant computing system and/or the second merchant computing system to review the plurality of historical purchase activity progressions;

generate, by the expenditure tracking server, a targeted offer for use by the consumer based on the indication of at least one predicted purchase transaction; and automatically transmit, by the expenditure tracking server, the targeted offer for use by the consumer in accordance with an application programming interface (API).

9. The system of claim 8, wherein the series of electronic payment transaction types of each historical purchase activity progression identifies at least one merchant type.

10. The system of claim 8, wherein the series of electronic payment transaction types of each historical purchase activity progression identifies at least one geographical location.

11. The system of claim 8, wherein the temporal factor is a time range.

12. The system of claim 8, wherein the determination of whether the current purchase activity progression maps to one of the plurality of historical purchase activity progressions comprises a determination of whether a merchant type of the first merchant computing system and a merchant type of the second merchant computing system matches a series of electronic payment transaction types for at least one of the plurality of historical purchase activity progressions.

13. The system of claim 8, wherein the indication identifies at least a merchant type of the predicted purchase transaction.

14. The system of claim 13, wherein the instructions stored further cause the one or more processors to:
generate a targeted offer for use by the consumer based on the indication of the predicted purchase transaction.

15. A computer-implemented method of processing payment vehicle transactions transmitted through electronic payment networks, comprising:

storing, by an expenditure tracking server implemented in an acquirer computing system, a plurality of historical purchase activity progressions, wherein each of the plurality of historical purchase activity progressions identifies a series of electronic payment transaction types, a historical temporal factor between each successive pair of electronic payment transaction types of the series of electronic payment transaction types, and a historical geographical parameter between each successive pair of electronic payment transaction types of the series of electronic payment transaction types;

subsequent to storing the plurality of historical purchase activity progressions, receiving, by an acquirer computing system, via Application Programming Interface (API) calls, transaction authorization requests for a plurality of electronic payment transactions for a consumer, each transaction authorization request comprising transaction data including a merchant identifier, a transaction time, and a geographic identifier;

mapping, by the expenditure tracking server and based on an analysis of the transaction data, the plurality of electronic payment transactions for the consumer to one of the plurality of historical purchase activity progressions, the mapping comprising:

matching, by a processor of the expenditure tracking server, at least a portion of the plurality of electronic payment transactions for the consumer to at least a portion of the series of electronic payment transaction types in the one of the plurality of historical purchase activity progressions stored in a database;

matching, by the processor of the expenditure tracking server, one or more current temporal factors corresponding to the at least a portion of the plurality of electronic payment transactions to one or more historical temporal factors corresponding to the at least a portion of the series of electronic payment transaction types in the one of the plurality of historical purchase activity progressions stored in the database; and matching, by the processor of the expenditure tracking server, one or more current geographical parameters corresponding to the at least a portion of the plurality of electronic payment transactions to one or more historical geographical parameters corresponding to the at least a portion of the series of electronic payment transaction types in the one of the plurality of historical purchase activity progressions stored in the database;

upon mapping the plurality of electronic payment transactions for the consumer to one of the plurality of historical purchase activity progressions stored in the database, generating and providing, by the expenditure tracking server, an indication of at least one predicted purchase transaction in accordance with an application programming interface (API);

generating and providing, by a specialized application executed on a computing device, a historical purchase activity progression interface, the historical purchase activity progression interface being a web portal configured to allow a receiving entity on the first merchant computing system and/or the second merchant computing system to review the plurality of historical purchase activity progressions;

generating, by the expenditure tracking server, a targeted offer for use by the consumer based on the indication of at least one predicted purchase transaction; and automatically transmitting, by the expenditure tracking server, the targeted offer for use by the consumer in accordance with an application programming interface (API).

16. The method of claim 15, wherein each of the historical purchase activity progressions identifies a plurality of merchant types.

17. The method of claim 16, the at least one predicted purchase transaction is based on the identification of a purchase transaction likely to transpire following at least a subset of the plurality of electronic payment transactions by the consumer.

18. The method of claim 15, wherein determining whether the plurality of electronic payment transactions for the consumer map to one of the plurality of historical purchase activity progressions comprises determining if a purchase at a first merchant computing system and a subsequent purchase at a second merchant computing system within a predetermined time window maps to any of the plurality of historical purchase activity progressions.

* * * * *